(No Model.) 2 Sheets—Sheet 1.
J. GINTY.
COMBINED PIPE COUPLING AND EXPANDING METALLIC SLEEVE.
No. 435,927. Patented Sept. 9, 1890.
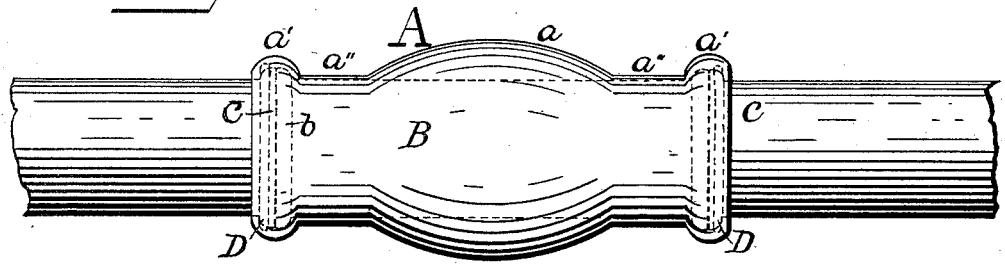
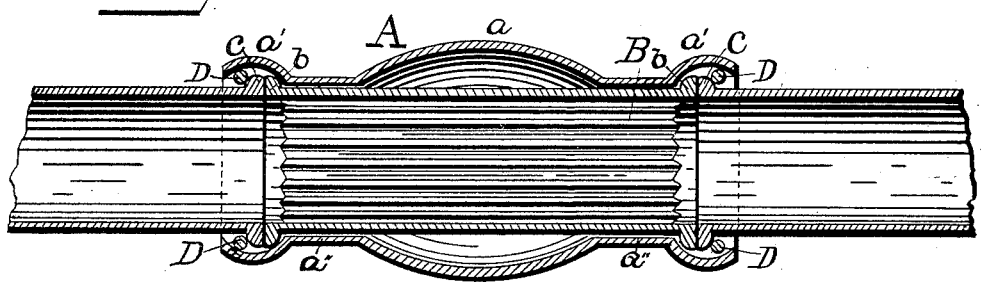
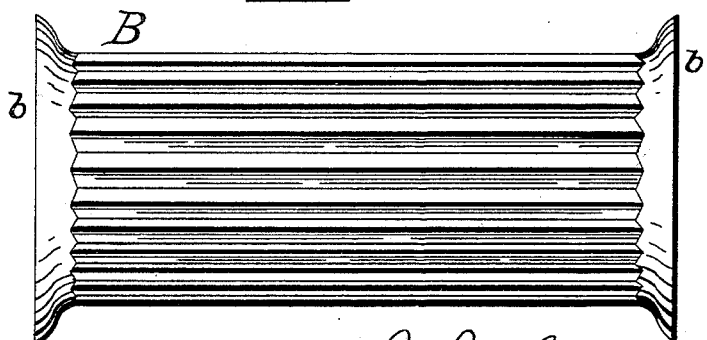
John Ginty, Inventor
Witnesses (No Model.) 2 Sheets—Sheet 2.

J. GINTY.
COMBINED PIPE COUPLING AND EXPANDING METALLIC SLEEVE.

No. 435,927. Patented Sept. 9, 1890.

Witnesses
John Ginty, Inventor

UNITED STATES PATENT OFFICE.

JOHN GINTY, OF SAN DIEGO, CALIFORNIA.

COMBINED PIPE-COUPLING AND EXPANDING METALLIC SLEEVE.

SPECIFICATION forming part of Letters Patent No. 435,927, dated September 9, 1890.

Application filed May 20, 1890. Serial No. 352,543. (No model.)

*To all whom it may concern:*

Be it known that I, JOHN GINTY, a citizen of the United States, and a resident of the city and county of San Diego, State of California, have invented a new and useful Combined Pipe-Coupling with Expanding Sleeve; and I hereby declare that the following is a full, clear, and exact description of the same, reference being had to the accompanying drawings.

My invention relates to certain novel features involved in the construction of pipe-coupling or the means of joining the ends of pipes together, as will be hereinafter described and claimed, reference being had to the accompanying drawings, in which—

Figure 4:
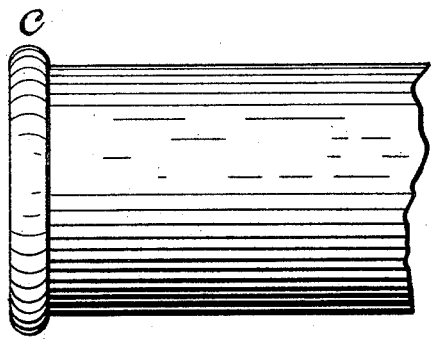
Figures 5, 7:
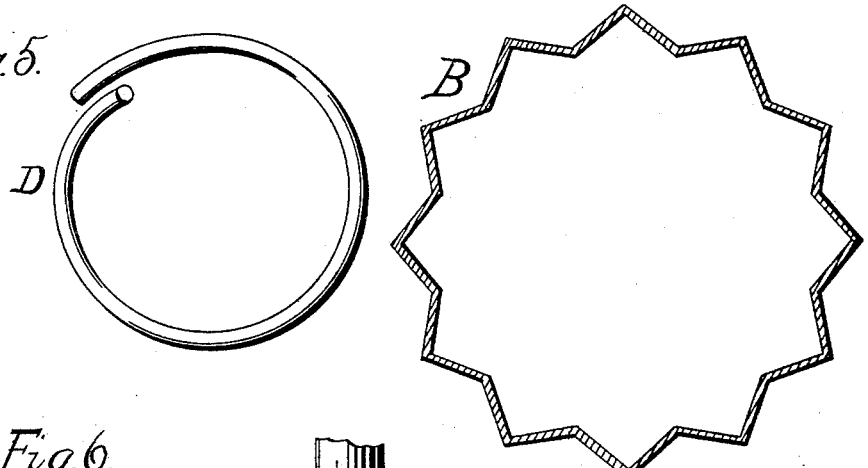
Figure 6:
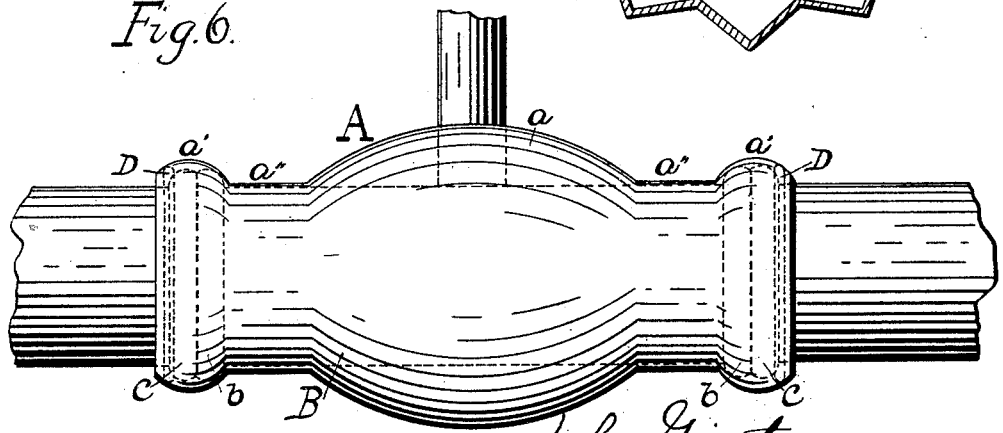

Figure 1 is a side elevation of my coupler applied to use, wherein the flexible sleeve is shown by dotted lines. Fig. 2 is a longitudinal section of Fig. 1. Fig. 3 is a side elevation of the flexible sleeve. Fig. 4 shows the end of one of the pipes, while Fig. 5 is a plan view of the adjustable ring. Fig. 6 is a varied form of coupling, adapting its use to terra cotta or other pipes. Fig. 7 is a transverse sectional view on an enlarged scale of the flexible section B.

The object of my invention is to equalize the pressure and to readily absorb any undue amount of pressure that may be suddenly brought to bear upon the pipes, and at the same time to provide an effective and convenient form of coupling, as will be hereinafter explained. The pipe is constructed with any preferred diameter, having an annular ring-like rim C on each end. The joints are then placed in position for coupling, the distance apart being determined by the length of the coupler used. The preferable length of coupler is from eight to twelve inches, though this matter is determined by the diameter of the joints to be coupled.

Referring in detail to the several parts of my invention, A is the body or outer covering of the coupler, the middle $a$ of which is somewhat enlarged, while each end thereof terminates in a collar $a'$, having a somewhat larger diameter than the straight section $a''$ of the body, while the inner face of such collar is concave.

Arranged on the inner side of the body A is the flexible section B, which has a sufficient length to reach from collar to collar, while the diameter thereof is coequal with that of the body, as shown by the dotted lines in Fig. 1. When it is desired to secure this coupling to a joint of the pipe, the annular rim C thereof is inserted into the collar $a'$, so that it will bear against the flared end $b$ of the adjustable section B, when the securing open spring-ring D is placed around the pipe closely against the annular rim C on the end thereof, when by its own tensile properties it will expand sufficiently to reach outwardly against the collar $a'$, and thereby close the opening, as its inner surface will be against the annular rim C of the pipe while its periphery will press against the collar $a'$, when the addition of putty, asbestus, or other suitable material may be made. The object of the enlarged part $a$ of the body A is to allow the adjustable section B to properly expand, as it is made of corrugated sheet metal or other preferred material, so formed that it will have a series of longitudinal ribs or folds, which, when acted upon from within by great pressure, will readily expand, and thus relieve the joints of the pipe from severe and undue strain. The intermediate space between the extended sides of the body A and the adjustable section B may be filled with suitable yielding material— such as rubber — or properly-constructed springs may be placed therein, that the sides of the adjustable section B may be properly re-enforced. In like manner ribs may be constructed on the inner side of the enlarged section $a$ of the coupling A, that the side of the adjustable section B, coming in contact therewith, will be supported and sustained. When this form of construction is observed, the adjustable section or diaphragm may be constructed of thin sheet metal or suitable material, and thus dispense with the corrugations or folds above referred to.

It will be understood that the strength of a pipe-line is measured by its weakest point. Therefore this coupling may be properly constructed so that if any part should break it will be at the point of union between the sections.

In Fig. 6 I have shown a varied form of construction of my improved coupler adapted to be used for joining terra-cotta and other pipes. It will be seen that I provide an outlet connected to the enlarged part *a* of the body A, reaching through the same into the adjustable section, and thus making full connection with the pipe-line.

Believing that the construction and advantages of my invention will be readily understood from the foregoing description, taken in connection with the accompanying drawings, further reference thereto is deemed unnecessary.

Having thus described my invention, what I claim as new, and desire to secure by Letters Patent, is—

1. A pipe-coupling adapted to compensate for the inequality of pressure maintained in a pipe-line, consisting of the anterior section A, the flexible diaphragm B, arranged within said section, the flared ends of which are adapted to reach snugly against the ends of the pipe-joint, and the open spring-ring arranged to fill the intermediate space between the annular rim of the pipe-joint and the concave face of the collar, as set forth.

2. A pipe-coupling adapted to neutralize undue and irregular pressure, consisting of the interior section B, having longitudinal corrugations or folds its entire length and further provided with flared ends to reach against the connecting ends of the pipe-joints, the anterior covering or body A, surrounding said section and provided on each end with the annular collar *a*, the inner face of which is concave and adapted to receive the connecting end of the pipe-joint, and the open spring-ring, substantially as described.

3. In a pipe-coupling adapted to neutralize unequal pressure, the combination of the body A, having the middle thereof enlarged, while each end is provided with the collar *a*, the flexible section or diaphragm B, provided longitudinally with corrugations, and, further, having on each end the flared rim adapted to meet the connecting ends of the pipe-joints, the spring-ring arranged to fill the opening between the annular rim of the pipe and the concave face of the collar, with a pipe-joint having on each end the annular rim, substantially as described, and for the purpose named.

In witness whereof I have hereunto set my hand and seal.

JOHN GINTY. [L. S.]

Witnesses:
   A. B. SMITH,
   THOS. H. MORTON.